United States Patent
Ghanea-Hercock et al.

(10) Patent No.: US 8,832,109 B2
(45) Date of Patent: Sep. 9, 2014

(54) DISTRIBUTED SYSTEM

(75) Inventors: Robert Ghanea-Hercock, Oxfordshire (GB); Hakan Duman, Suffolk (GB); Alexander L Healing, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 12/675,585

(22) PCT Filed: Sep. 3, 2008

(86) PCT No.: PCT/GB2008/002983
§ 371 (c)(1),
(2), (4) Date: Feb. 26, 2010

(87) PCT Pub. No.: WO2009/030902
PCT Pub. Date: Mar. 12, 2009

(65) Prior Publication Data
US 2010/0211570 A1    Aug. 19, 2010

(30) Foreign Application Priority Data

Sep. 3, 2007    (EP) .................................. 07253475

(51) Int. Cl.
*G06F 7/00*    (2006.01)
*G06F 17/30*    (2006.01)
*H04L 29/08*    (2006.01)

(52) U.S. Cl.
CPC ............. *H04L 67/16* (2013.01); *H04L 67/20* (2013.01); *H04L 67/02* (2013.01)
USPC ............ 707/739; 707/737; 715/762; 715/853

(58) Field of Classification Search
CPC .......... G06Q 30/0641; G06Q 30/0629; G06F 17/30873; G06F 17/3089; Y10S 707/99943
USPC ....................................................... 707/739
See application file for complete search history.

(56) References Cited

U.S. PATENT DOCUMENTS 5,943,670 A    8/1999   Prager
6,484,149 B1 *  11/2002  Jammes et al. ............ 705/26.62

(Continued)

FOREIGN PATENT DOCUMENTS

JP    2005-326970    11/2005
TW       591519        6/2004

(Continued)

OTHER PUBLICATIONS

International Search Report for PCT/GB2008/002983, mailed Jan. 22, 2009.

(Continued)

*Primary Examiner* — Binh V Ho
(74) *Attorney, Agent, or Firm* — Nixon & Vanderhye P.C.

(57) ABSTRACT

The present invention relates to distributed systems in which resource utilisation decisions depend upon the semi-automatic categorisation of resource descriptions stored in the distributed system. In the principal embodiment, the resource descriptions are web service descriptions which are augmented with tags (i.e. descriptive words or phrases) entered by users and/or by web service administrators. The initial use of automatic categorisation of these descriptions, followed by a user-driven fine-tuning of the automatically-generated categories enables the rapid creation of reliable categorisation of the resource descriptions, which in turns results in better resource utilisation decisions and hence a more efficient use of the resources of the distributed system.

19 Claims, 12 Drawing Sheets

(56) References Cited

U.S. PATENT DOCUMENTS

| | | | |
|---|---|---|---|
| 6,668,256 | B1 | 12/2003 | Lynch |
| 6,760,721 | B1* | 7/2004 | Chasen et al. ........................ 1/1 |
| 6,961,731 | B2* | 11/2005 | Holbrook ............................. 1/1 |
| 7,167,901 | B1 | 1/2007 | Beadle et al. |
| 7,548,914 | B2 | 6/2009 | Bell et al. |
| 7,685,198 | B2 | 3/2010 | Xu et al. |
| 7,685,200 | B2 | 3/2010 | Gunawardena et al. |
| 7,822,771 | B1 | 10/2010 | Chaves et al. |
| 7,870,135 | B1 | 1/2011 | Cheung |
| 7,953,775 | B2 | 5/2011 | Dasdan |
| 8,630,627 | B2 | 1/2014 | Davitz et al. |
| 2003/0191828 | A1 | 10/2003 | Ramanathan et al. |
| 2003/0231209 | A1 | 12/2003 | Kappe et al. |
| 2004/0123239 | A1* | 6/2004 | Roessler ...................... 715/513 |
| 2004/0139106 | A1 | 7/2004 | Bachman et al. |
| 2004/0167931 | A1 | 8/2004 | Han |
| 2004/0168115 | A1* | 8/2004 | Bauernschmidt et al. .... 715/500 |
| 2004/0267734 | A1 | 12/2004 | Toshima |
| 2005/0015732 | A1* | 1/2005 | Vedula et al. ................. 715/805 |
| 2005/0022129 | A1* | 1/2005 | Borenstein et al. ........... 715/734 |
| 2006/0053175 | A1 | 3/2006 | Gardner et al. |
| 2006/0117003 | A1 | 6/2006 | Ortega et al. |
| 2006/0184566 | A1 | 8/2006 | Lo et al. |
| 2006/0206296 | A1* | 9/2006 | Sato et al. ....................... 703/13 |
| 2006/0221190 | A1 | 10/2006 | Limberis et al. |
| 2006/0294101 | A1* | 12/2006 | Wnek ............................... 707/7 |
| 2007/0016467 | A1* | 1/2007 | John et al. ........................ 705/10 |
| 2007/0038622 | A1 | 2/2007 | Meyerzon et al. |
| 2007/0050351 | A1 | 3/2007 | Kasperski et al. |
| 2007/0078832 | A1 | 4/2007 | Ott et al. |
| 2007/0174247 | A1 | 7/2007 | Xu et al. |
| 2007/0226077 | A1* | 9/2007 | Frank et al. ..................... 705/27 |
| 2008/0005651 | A1 | 1/2008 | Grefenstette et al. |
| 2008/0037877 | A1* | 2/2008 | Jia et al. ......................... 382/224 |
| 2008/0040674 | A1 | 2/2008 | Gupta |
| 2008/0195657 | A1 | 8/2008 | Naaman et al. |
| 2008/0235216 | A1 | 9/2008 | Ruttenberg |
| 2008/0270538 | A1 | 10/2008 | Garg et al. |
| 2009/0012991 | A1* | 1/2009 | Johnson et al. ........... 707/103 R |
| 2009/0187837 | A1 | 7/2009 | Fusaro et al. |
| 2009/0319513 | A1 | 12/2009 | Terao et al. |

FOREIGN PATENT DOCUMENTS

| | | |
|---|---|---|
| WO | 99/40505 | 8/1999 |
| WO | 01/46843 | 6/2001 |
| WO | 2004/015950 | 2/2004 |
| WO | 2005/114959 | 12/2005 |
| WO | 2009/030902 | 3/2009 |

OTHER PUBLICATIONS

Aberer, K., Cudré-Mauroux, P., Datta, A., Despotovic, Z., Hauswirth, M. and Punceva, M. (2003) P-Grid: A Self-organizing Structured P2P System. ACM SIGMOD Record, 32(3), Sep. 2003, 5 pgs.

Lv, Q., Cao, P., Cohen, E., Li, K. and Shenker, S. (2002) Search and replication in unstructured peer-to-peer networks. Proceedings of the 16th international conference on Supercomputing, pp. 84-95, 12 pgs.

Rowstron A. and Druschel P. (2001). Pastry: scalable, decentralized object location and routing for largeScale Peer-to-Peer systems. Proceedings of 18th Conference on Distributed Systems Platforms. Heidelberg, 22 pgs.—see http://research.microsoft.com/en-us/um/people/antr/PAST/pastry.pdf.

Stoica, I., Morris, R., Karger, D., Kaashoek, M.F. and Balakrishnan, H. (2002) Chord: A scalable peer-to-peer lookup service for internet applications. SIGCOMM, pp. 149-160, 12 pgs.

Warren, P., I. Thurlow, and D. Alsmeyer, Applying Sematic Technology to a Digital Library, in Semantic Web Technologies: Trends and Research in Ontology-based Systems, J. Davies, R. Studer, and P. Warren, Editors. (2006), John Wiley & Sons Ltd: Chichester, England.—see http://www.eswc2006.org/www.eswc2006.org/poster-papers/FP44-Thurlow.pdf, 2 pgs.

Mika, P. Ontologies Are Us: A Unified Model of Social Networks and Semantics, in The Semantic Web—ISWC 2005.(2005). Galway, Ireland: Springer, 15 pgs.

Berners-Lee, T., J. Hendler, and O. Lassila, The Semantic Web. Scientific American, (2001). May 2001—http://www-sop.inria.fr/acacia/cours/essi2006/Scientific%20American_%20Feature%20Article_%20The%20Semantic%20Web_%20May%202001.pdf, 4 pgs.

Christoph Schmitz., Self-Organization of a Small World by Topic Proc, 1st International Workshop on Peer-to-Peer Knowledge Management (2004), 12 pgs.

D Elliman, JRG Pulido, "Visualizing Ontology Components through Self-Organizing Maps," iv, p. 434, Sixth International Conference on Information Visualisation (IV'02), 2002, 5 pgs.

KeWei Tu, Miao Xiong, Lei Zhang, HaiPing Zhu, Jie Zhang and Yong Yu, "Towards Imaging Large-Scale Ontologies for Quick Understanding and Analysis". In Proceedings of the Fourth International Semantic Web Conference (ISWC2005), LNCS 3729/2005, Galway, Ireland, Nov. 6-10, 2005, 14 pgs.

Brin, S., and Page, L. "The Anatomy of a Large-Scale Hypertextual Web Search Engine", (1998). Proceedings of the seventh international conference on World Wide Web 7: 107-117 (Section 2.1.1 Description of PageRank Calculation)—see http://ilpubs.stanford.edu:8090/361/1/1998-8.pdf, 20 pgs.

Chakrabarti, S., van den Berg, M., and Dom, B. (1999). Focused crawling: a new approach to topic-specific web resource discovery.— see http://www.cse.iitb.ac.in/soumen/doc/www1999f/pdf/www1999f.pdf, 18 pgs.

Prieto-Diaz, R.; , "A faceted approach to building ontologies," Information Reuse and Integration, 2003. IRI 2003. IEEE International Conference on , vol., No., pp. 458-465, Oct. 27-29, 2003, 8 pgs.

Fidelia Ibekwe-SanJuan, "Constructing and maintaining knowledge organization tools", Journal of Documentation, Emerald Publishing Group, 62 (2), 2006, 229-250—see http://fidelia1.free.fr/JDOC.pdf, 26 pgs.

Hai Zhuge, "Query Routing in a Peer-To-Peer Semantic Link Network", Computational Intelligence, vol. 21, No. 2, 2005—see http://kg.ict.ac.cn/paper/P2PSLN-C&I.pdf, 20 pgs.

D. Zeinalipour-Yazti, Vana Kalogeraki, and Dimitrios Gunopulos. 2005. Exploiting locality for scalable information retrieval in peer-to-peer networks. Inf. Syst. 30, Jun. 4, 2005, 277-298—see http://alumni.cs.ucr.edu/~csyiazti/papers/els-ism-2003/els-ism-2003.pdf, 32 pgs.

Borys Omelayenko, "Learning of Ontologies for the Web: the Analysis of Existent Approaches", In Proceedings of the International Workshop on Web Dynamics, 2001, 10 pgs.

Lixin Han, Guihai Chen, and Li Xie. 2004. A method of acquiring ontology information from web documents. In Proceedings of the First international conference on Computational and Information Science (CIS'04)—see http://cs.nju.edu.cn/papers/UploadFiles/CIS2004.pdf, 6 pgs.

Thanh Tho Quan; Siu Cheung Hui; Fong, A.C.M.; , "Automatic fuzzy ontology generation for semantic help-desk support," Industrial Informatics, IEEE Transactions on , vol. 2, No. 3, pp. 155-164, Aug. 2006, 10 pgs.

Yusef Hassan-Montero and Victor Herrero-Solana, "Improving Tag-Clouds as Visual Information Retrieval Interfaces", MERÍDA, INSCIT2006; 6 pgs.

B. Fortuna, M. Grobelnik, D. Mladenic, Semi-automatic Data-driven Ontology Construction System. Proceedings of the 9th International multi-conference Information Society IS-2006, Ljubljana, Slovenia; 4 pgs.

T Hammond, T Hannay, B Lund, J Scott, "Social Bookmarking Tools (I): A General Review", D-Lib Magazine 11(4), 2005—see http://www.dlib.org/dlib/april05/hammond/04hammond.html, 23 pgs.

Xu, Zhichen and Fu, Yun and Mao, Jianchang and Su, Difu, "Towards the Semantic Web: Collaborative Tag Suggestions", Proceedings of the Collaborative Web Tagging Workshop at the WWW 2006—see http://semanticmetadata.net/hosted/taggingws-www2006-files/13.pdf, 8 pgs.

Alex Barnett's blog entry, "Solving Tag-Hell", Feb. 2006—see http://blogs.msdn.com/b/alexbarn/archive/2006/02/03/523879.aspx, 6 pgs.

Marieke Guy, Emma Tonkin, "Folksonomies—Tidying up Tags?" D-Lib Magazine, Jan. 2006, vol. 12 No. 1.—see http://www.dlib.org/dlib/january06/guy/01guy.html, 14 pgs.

(56) References Cited

OTHER PUBLICATIONS

L. Jing, L. Zhou, M. K. Ng, and J. Z. Huang, "Ontology-based distance measure for text clustering", In Workshop on Text Mining, SIAM International Conference on Data Mining, Bethesda, MD, 2006—see http://silverfish.iiitb.ac.in/ver0/nutch_crawled_pdfs/indexed/OntologyBased-DistanceMeasure-.pdf, 8 pgs.

McIlraith, Sheila A., Tran Cao Son, and Honglei Zeng. "Semantic web services." *Intelligent Systems*, IEEE 16, No. 2 (2001): 46-53—see http://o2k.stanford.edu/people/sam/ieee01.pdf, 8 pgs.

Shilad Sen, Shyong K. Lam, Al Mamunur Rashid, Dan Cosley, Dan Frankowski, Jeremy Osterhouse, F. Maxwell Harper, and John Riedl. 2006. tagging, communities, vocabulary, evolution. In Proceedings of the 2006 20th anniversary conference on Computer supported cooperative work (CSCW '06). ACM, New York, NY, USA, 181-190, 10 pgs.

Holger Lausen and Thomas Haselwanter, "Finding Web Services", In Proc. of the 1st European Semantic Technology Conference (ESTC), 2007, 7 pgs.

Daniel R. Cosley, "MaSH: Making Serendipity Happen", Master of Science Thesis submitted to James Madison University—see http://www-users.cs.umn.edu/~cosley/research/papers/MaSH.pdf, May 1999, 79 pgs.

Nick Lothian, "Taxonomy Directed Folksonomies", blog entry, Dec. 13, 2006, 4 pgs.

Wikipedia's Page entitled "Folksonomy"—downloaded Jun. 7, 2007, 4 pgs.

Elaine Peterson, "Beneath the Metadata—Some Philosophical Problems with Folksonomy", D-Lib Magazine, Nov. 2006, vol. 12 No. 11—see http://www.dlib.org/dlib/november06/peterson/11peterson.html, 7 pgs.

Rashmi Sinha, "Clustering Comes to Flickr", blog entry Aug. 4, 2005, 5 pgs.

GammaSite—How It Works Categorization—web-page downloaded on Aug. 29, 2007, 2 pgs.

Rashmi Sinha, "A Cognitive Analysis of Tagging"—blog entry Sep. 27, 2005, 28 pgs.

Rashmi Sinha, "Tag Sorting: Another tool in an Information Architect's Toolbox",—blog entry Feb. 26, 2005, 6 pgs.

Knerr, Torben. "Tagging ontology—towards a common ontology for folksonomies." 2008, 6 pgs.

Thomas Gruber (2005). Ontology of Folksonomy: A Mash-up of Apples and Oranges. Int'l Journal on Semantic Web & Information Systems, 3(2), 2007. Originally published in 2005 on the web—see http://tomgruber.org/writing/ontology-of-folksonomy.htm, 6 pgs.

International Search Report for PCT/GB2010/000568 mailed Jun. 10, 2010.

Office Action (11 pgs.) dated Jun. 25, 2012 issued in co-pending U.S. Appl. No. 13/254,971.

International Search Report for PCT/GB2009/000845, mailed May 8, 2009.

Calefato, F. et al., "Towards Social Semantic Suggestive Tagging", 4$^{th}$ Italian Web Workshop Semantic Web Applications and Perspectives SWAP 2007, (2007), Abstract.

Nikhil, G. et al., "Personalized tag suggestion for flickr", ACM, Proceeding of the 17$^{th}$ Int'l. Conf. on World Wide Web, (Apr. 21, 2008), Abstract.

Hayman, S., & Lothian, N. (2007). Taxonomy Directed Folksonomies: Integrating user tagging and controlled vocabularies for Australian education networks. World Library and Information Congress: 73rd IFLA General Conference and Council, Aug. 19-23, 2007, Durban, South Africa—available at http://archive.ifla.org/IV/ifla73/papers/157-Hayman_Lothian-en.pdf, 27 pgs.

Lucia Specia and Enrico Motta, Integrating Folksonomies with the Semantic Web. In Proceedings of the 4th European conference on The Semantic Web: Research and Applications (ESWC '07), Enrico Franconi, Michael Kifer, and Wolfgang May (Eds.). Springer-Verlag, Berlin, Heidelberg, 2007, 624-639, 32 pgs.

Hsieh W et al: "A collaborative tagging system for learning resources sharing," Current Developments in Technology-Assisted Education vol. II. Formatex, [Online] vol. 2, 2006, pp. 1364-1368, XP002486118 Badajoz, Spain ISBN: 978-84-690-2472-8, 6 pgs.

Brooks H B et al.: "Improved annotation of the blogosphere via autotagging and hierarchical clustering" Proceedings of 15th International World Wide Web Conference WWW2006, [Online] May 23, 2006, pp. 625-631, Edinburg, Scotland, UK ISBN: 1-59593-323-9, 7 pgs.

Bruno M et al: "An approach to support Web service classification and annotation" Proceedings. The 2005 IEEE International Conference on E-Technology, E-Commerce and E-Service IEEE Comput. Soc Los Alamitos, CA, USA, 2005, pp. 138-143, ISBN: 0-7695-2274-2, 6 pgs.

Ae-Ttie Ji et al: "Collaborative tagging in recommender systems" AI 2007: Advances in Artificial Intelligence. Proceedings 20th Australian Joint Conference on Artificial Intelligence. (Lecture Notes in Artificial Intelligence vol. 4830) Springer-Verlag Berlin, Germany, 2007, pp. 377-386, ISBN: 3-540-76926-9, 10 pgs.

Meyer H et al: "Light-weight semantic service annotations through tagging" Service-Oriented Computing—ICSOC 2006. 4th International Conference. Proceedings (Lecture Notes in Computer Science vol. 4294) Springer-Verlag Berlin, Germany, 2006, pp. 465-470, ISBN: 3-540-68147-7, 6 pgs.

Kaser O et al: "Tag-Cloud Drawing: Algorithms for Cloud Visualization" Proceedings of Tagging and Metadata for Social Information Organization Workshop in Conjunction With the 16th International World Wide Web Conference WWW2007, [Online] May 8, 2007, Banff, Canada, 10 pgs.

Niwa S et al: "Web page recommender system based on folksonomy mining for ITNG '06 submissions" Proceedings. Third International Conference on Information Technology: New Generation IEEE Computer Society Los Alamitos, CA, USA, 2006, p. 6 pgs.

You Are What You Tag by: Yi-Ching Huang, Chia-Chuan Hung, Jane Y. Hsu in Proceedings of AAAI 2008 Spring Symposium Series on Social Information Processing (2008)—see http://www.aaai.org/Papers/Symposia/Spring/2008/SS-08-06/SS08-06-008.pdf, 6 pgs.

International Search Report dated May 27, 2009 issued in International Application No. PCT/GB2009/000841.

Office Action dated Feb. 16, 2012 issued in co-pending U.S. Appl. No. 12/918,489.

International Search Report dated May 8, 2009 issued in International Application No. PCT/GB2009/000845.

Wen-Tai Hsieh et al., "A collaborative tagging system for learning resources sharing", Current Developments in Technology-Assisted Education (2006), XP-002486118, 6 pgs.

Office Action (14 pgs.) dated Apr. 25, 2012 issued in co-pending U.S. Appl. No. 12/919,571.

Milan Vojnovic, James Cruise, Dinan Gunawardena, Peter Marbach: "Ranking and Suggesting Tags in Collaborative Tagging Applications" Feb. 2007, Microsoft Corporation, Technical Report MSR-TR-2007-06, Microsoft Research, 17 pgs.

Office Action (13 pgs.) dated Apr. 24, 2014 issued in co-pending U.S. Appl. No. 13/254,971.

C Shirky, "Ontology is Overrated: Categories, Links and Tags"—see http://shirky.com/writings/ontology_overrated.html, 20 pgs, 2005.

Grigory Begelman,"Automated Tag Clustering: Improving search and exploration in the tag space", In Proc. of the Collaborative Web Tagging Workshop at WWW'06, May 22-26, 2006—see http://www.pui.ch/phred/automated_tag_clustering/automated_tag_clustering.pdf.

Rashmi's blog, "A cognitive analysis of tagging", posted on Sep. 27, 2005 (30 pgs.).

Office Action (17 pgs.) dated Feb. 12, 2014 issued in co-pending U.S. Appl. No. 12/919,571.

* cited by examiner

| Service ID | User-Assigned Tags | Categories |
|---|---|---|
| H1 | <helicopter>, <fast>, <thermal>, <camera> <nightvision> | Comms.Camera.Mobile |

Figure 2A

| Service ID | User-Assigned Tags | Categories |
|---|---|---|
| H2 | <helicopter>, <location>, <mapping>, <display> <passenger> | Location |

Figure 2B

| Service ID | User-Assigned Tags | Categories |
|---|---|---|
| C1 | <road>, <driver>, <car> <remember> <text> | Comms.Display.Text |

Figure 2C

| Service ID | User-Assigned Tags | Categories |
|---|---|---|
| C2 | <road>, <driver>, <car> <touchscreen>, <remember> <interactive>, <location>, <mapping> <picture> | Comms.Display.Graphics |

Figure 2D

| Service ID | User-Assigned Tags | Categories |
|---|---|---|
| C3 | <voice> <radio> | Comms.Voice |

Figure 2E

| Service ID | User-Assigned Tags | Categories |
|---|---|---|
| P1 | <beat>, <voice>, <acknowledged> <noisy> | Comms.Voice |

Figure 2F

| Service ID | User-Assigned Tags | Categories |
|---|---|---|
| S1 | <road> , <drivers>, <sign>, <text> | Comms.Display.Text |

Figure 2G

| Service ID | User-Assigned Tags | Categories |
|---|---|---|
| S2 | <road> , <drivers>, <sign>, <graphics> | Comms.Display.Graphics |

Figure 2H

| Service ID | User-Assigned Tags | Categories |
|---|---|---|
| C4 | <gps>, <driver> <direction> <route> | Location |

Figure 2I

| Service ID | User-Assigned Tags | Categories |
|---|---|---|
| F1 | <yobs> <fridaynight> <towncentre> <view> <street> <remotecontrolled> <camera> | Comms.Camera.Fixed |

Figure 2J

DISTRIBUTED SYSTEM

This application is the U.S. national phase of International Application No. PCT/GB2008/002983, filed 3 Sep. 2008, which designated the U.S. and claims priority to European Application No. 07253475.3, filed 3 Sep. 2007, the entire contents of each of which are hereby incorporated by reference.

BACKGROUND AND SUMMARY

The present invention relates to a distributed system. It has particular utility in distributed systems built in accordance with a service-oriented architectures and also in distributed information storage and retrieval systems The dominant electronic information retrieval system in the world today is the World Wide Web. The largely unstructured nature of the Web means that the primary method of identifying a web-page containing the information which a user requires is to use a search engine. Search engines normally generate full-text indices which can be used to quickly identify web-pages which contain all the words included in the user's search query. Page-ranking algorithms are then used to present the most relevant of those web-pages to the user. Some search engines, for example clusty.com, cluster the results.

When a user finds a web-page which contains useful information he can save the address (URL) of the web-page on the computer which he is using to browse the Web. This is the familiar 'bookmarking' process. The 'bookmarking' interface enables a user to store bookmarks in a hierarchical folder system. Hence, the user is able to navigate to a useful page by drilling down to a relevant folder in the hierarchical folder system.

U.S. Pat. No. 7,167,901 discloses a 'bookmarking' interface in which the user's web browser automatically generates records for each bookmarked web-page which include keywords describing the content of that web-page. In addition, the user is provided with an interface which allows him to view the keywords associated with a bookmarked web-page and to add further keywords for association with that web-page.

The above US patent contemplates that one user might send another user his bookmark file. So-called social bookmarking is a development of this idea in which many users upload the bookmarks stored on their own computers to a server computer. That server computer then offers the bookmark information to those users and often to other users too.

Some such sites offer users the ability to interact with the server computer to add annotations to the shared bookmarks. These annotations might be user ratings for the web-page or keywords which the user has assigned to the web-page (the latter often being referred to as 'tags'). An example of such a site is the web-site del.icio.us. The web-site del.icio.us allows users to see a list of sites tagged with a given word by users. It is trivial to rank them by the number of users which have given a web-page the same tag. This gives some idea of user's perception of the quality of the web-page and also its relevance to that tag.

The above-mentioned U.S. Pat. No. 7,167,901 envisages a stand-alone system where the browser program can provide the user with a list of bookmarked web-pages associated (either automatically or by the user) with a user-specified keyword.

Del.icio.us users can organise tags into user-defined clusters. Flickr (www.flickr.com) sometimes presents its search results in the form of clusters. Users can then identify which cluster is likely contain results they are interested in and refine their search to present only results in that cluster.

Whilst tagging of most types of information (e.g. web pages, photographs, videos) is well known, there is little literature about tagging of software components (e.g. Web Services) for use in building distributed applications.

A number of companies specialise in software which introduces structure into a mass of unstructured documents by categorizing those documents on the basis of keywords extracted from those documents. The companies in this field include Autonomy Inc (www.autonomy.com), GammaSite Inc (www.gammasite.com), and Inxight Software Inc (www.inxight.com).

A customer of these companies can use the software to categorize unstructured documents, and thus expedite the retrieval of information (since the search can be limited to the category in which the customer is interested).

The present inventors have seen how tagging and automatic structure generation can be usefully combined and applied to distributed applications in order to improve the performance of systems running distributed applications.

According to a first aspect of the present invention, there is provided a distributed system comprising:
one or more computers arranged in operation to:
i) receive digital resource identifiers and words attributed to the digital resources, and to automatically generate a classification of said digital resources on the basis of said attributed words;
ii) present a human user with a graphical user interface enabling modification of said automatically generated classification;
iii) modify said classification in accordance with user commands received via said graphical user interface; and
iv) utilise said modified classification in identifying one or more digital resources.

By automatically organising digital resources into groups based on keywords attributed to those digital resources, thereafter presenting a user with an interface enabling the modification of those groups, and subsequently utilising said modified grouping in finding an entity for a user, the speed of retrieval of a digital resource is improved.

Where the digital resources are documents, this results in the speed of retrieval of information relevant to the user's query being improved. Where the digital resources are distributed software components, this enables the rapid and effective location of a suitable component, and the rapid substitution of another component in the event that a first-selected component is unavailable.

BRIEF DESCRIPTION OF THE DRAWINGS

There now follows a description, given by way of example only, of specific embodiments of the present invention, which refers to the accompanying drawings in which:

FIGS. 2A to 2J show service records stored in respective service hosts of the infrastructure;

DETAILED DESCRIPTION OF PRESENT EXAMPLE EMBODIMENTS

Figure 1:
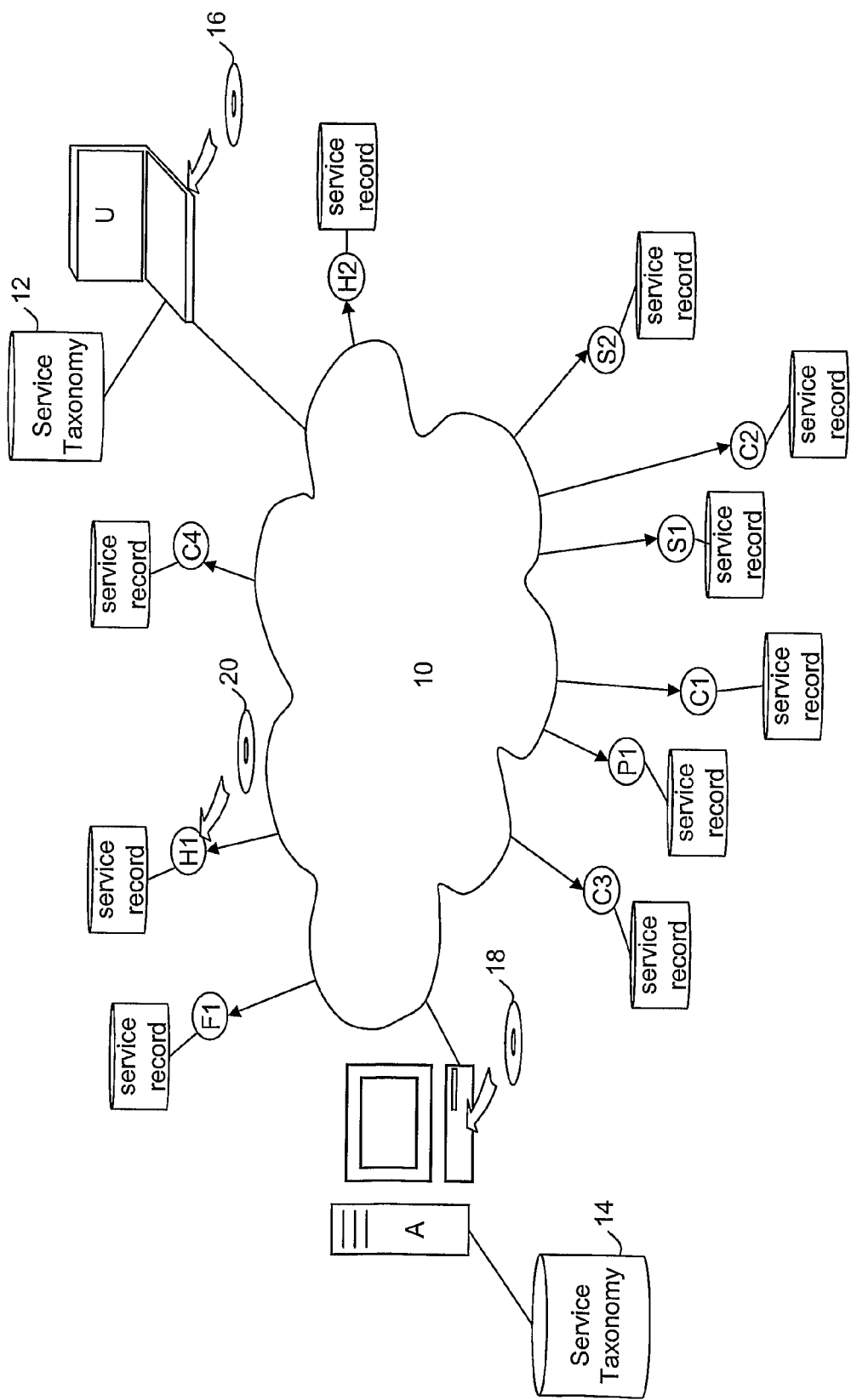
FIG. 1 shows networked service-based infrastructure used in supporting a metropolitan police force.

FIG. 1 shows a plurality of electronic devices including displays, cameras and location-reporting systems (C1, C2, C3, C4, H1, H2, S1, S2, F1, P1). Each of these devices is able to run application programs, and components of applications distributed across the infrastructure, since it includes an embedded system which runs a suitable operating system such as Windows CE. Each device has inbound and outbound communications links with communications network 10, and has a persistent memory in which updateable service records are stored. The electronic devices provide services in response to commands issued by a user of laptop computer U connected to the network 10. The laptop computer U includes persistent storage 12 such as a hard disk. Also connected to the network 10 is an administration computer A which has persistent storage 14. Although only one user computer is illustrated, in practice a plurality (tens or even hundreds) of such user computers might be connected to the network 10.

Each of the programmable devices/computers stores and executes middleware which enables the devices/computers to overlay an application-level network on the network, to provide services to other devices/computers on the network and to find and execute services on other devices/computers in the network. An example of suitable middleware is NEXUS middleware as described in the paper 'NEXUS—resilient intelligent middleware' by Nima Kaveh and Robert Ghanea-Hercock published in BT Technology Journal, vol. 22 no. 3, July 2004 pp 209-215—the entire contents of which are hereby incorporated by reference. FIG. 1 shows the middleware from CD-ROM 20 being installed on electronic device H1—it is to be understood that the middleware will be installed on each of the other electronic devices too. The middleware might instead be introduced as firmware in the electronic device, or be downloaded from a program server (not shown) connected to the network 10.

Alternatively, commercially available middleware such as IBM's WebSphere or BEA's WebLogic could be used.

A service browser application is loaded from CD 16 onto laptop U which in addition to providing a user interface enabling the user to request services from the programmable devices, also provides the user with an interface allowing the user to augment the service records by adding one or more tags to those service records. Correspondingly, each of the programmable devices is provided with software which responds to service requests and allows the service record stored in the device's persistent memory to be updated.

Management software is loaded from CD 18 onto administration computer A which enables the administrator to download service records from the various electronic devices, process those service records, and then upload amended service records to the various devices. The processing of service records include the semi-automatic categorization of those service records as will be described in detail below.

FIGS. 2A to 2J show the service records stored at each of the devices (C1, C2, C3, C4, H1, H2, S1, S2, F1, P1). Each service record includes a service identifier (leftmost column), a list of tags assigned by users and/or administrators (second column), and a tag-based categorisation of the service (rightmost column). It will be seen that each tag comprises a word or concatenated combination of words. The service identifier is input at the time the device is set-up, the user-assigned tags and category fields are populated during use of the system as described below.

Figure 3:
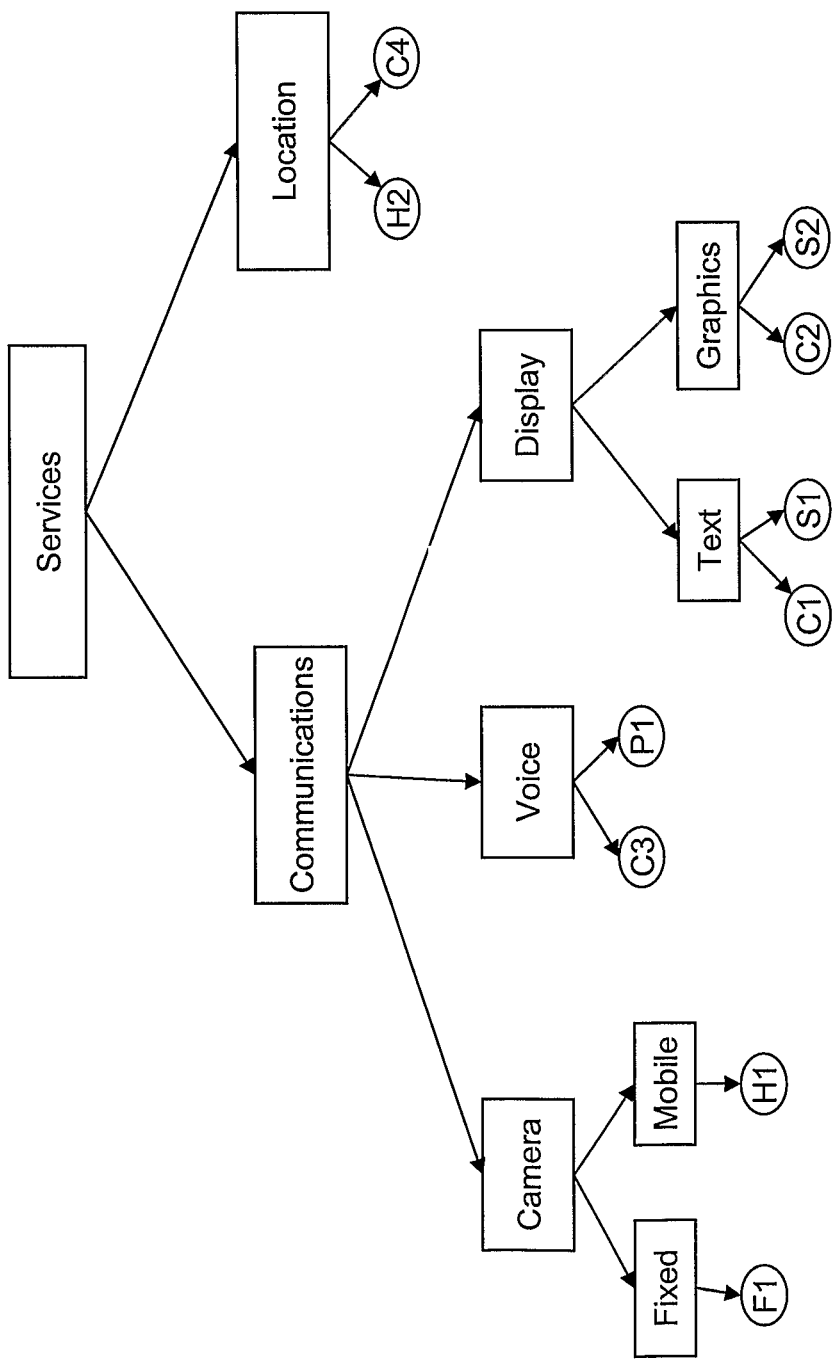
FIG. 3 shows the services offered by the service-based infrastructure organized into a taxonomy.

FIG. 3 shows a service taxonomy which is generated by the administration computer A by a semi-automatic process which will be described in detail below. The service taxonomy is stored in the persistent storage 12 at each client computer (e.g. FIG. 1: U) in the service-based infrastructure. The service taxonomy is stored as a tree, with the leaf nodes of the tree including references to services which have been categorized as belonging to the category represented by the leaf node. The service taxonomy is also stored in the administration computer's persistent storage 14. The names of the service categories are chosen by the administrator during the manual phase of the categorization process, as will be described below.

Figure 4:
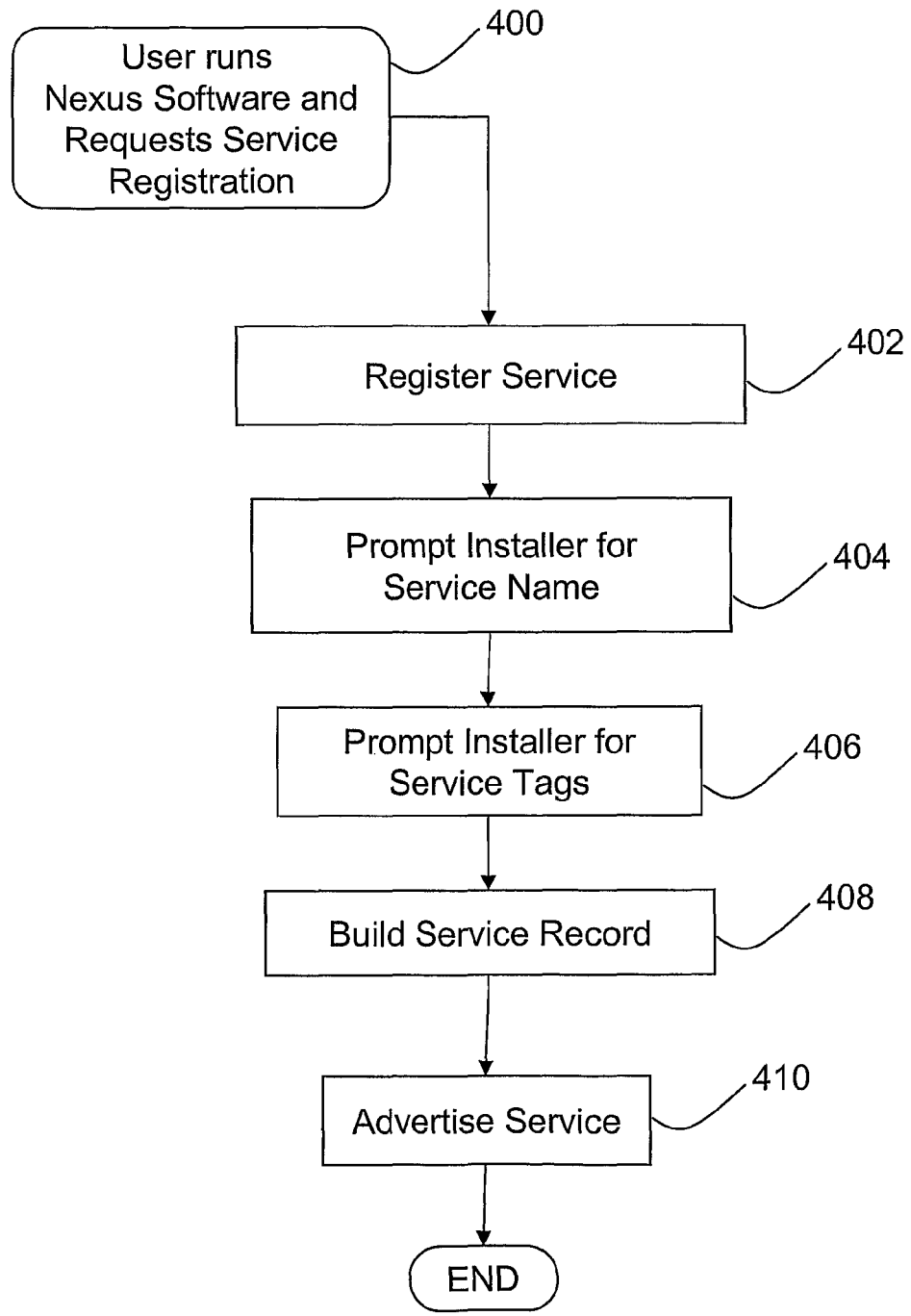
FIG. 4 is a flow-chart illustrating the how a service host registered with the service-based infrastructure.

FIG. 4 shows service installation software provided as part of the Nexus middleware. The installation process starts with the user installing and running the Nexus software (step 400) on the electronic device (e.g. H1) and requesting the registration (step 402) of the device's in-built software as a Nexus service. The user is then prompted (step 404) to provide a name for the service. The user is also prompted (step 406) to enter any tags which he considers should be applied to the service. The program then builds (step 408) a service record (FIG. 2A-2J) for the service including the information entered by the installer. Initially, the category field of the service record is set null. The service is then advertised (410) across the Nexus system, allowing it to be invoked by, for example, a user of user computer U when running the Nexus service browser. Those skilled in the art will realise that the service will be described using a service description language such as WSDL. The service description includes interfaces allowing a remote computer to query and update that service record.

Figure 5:
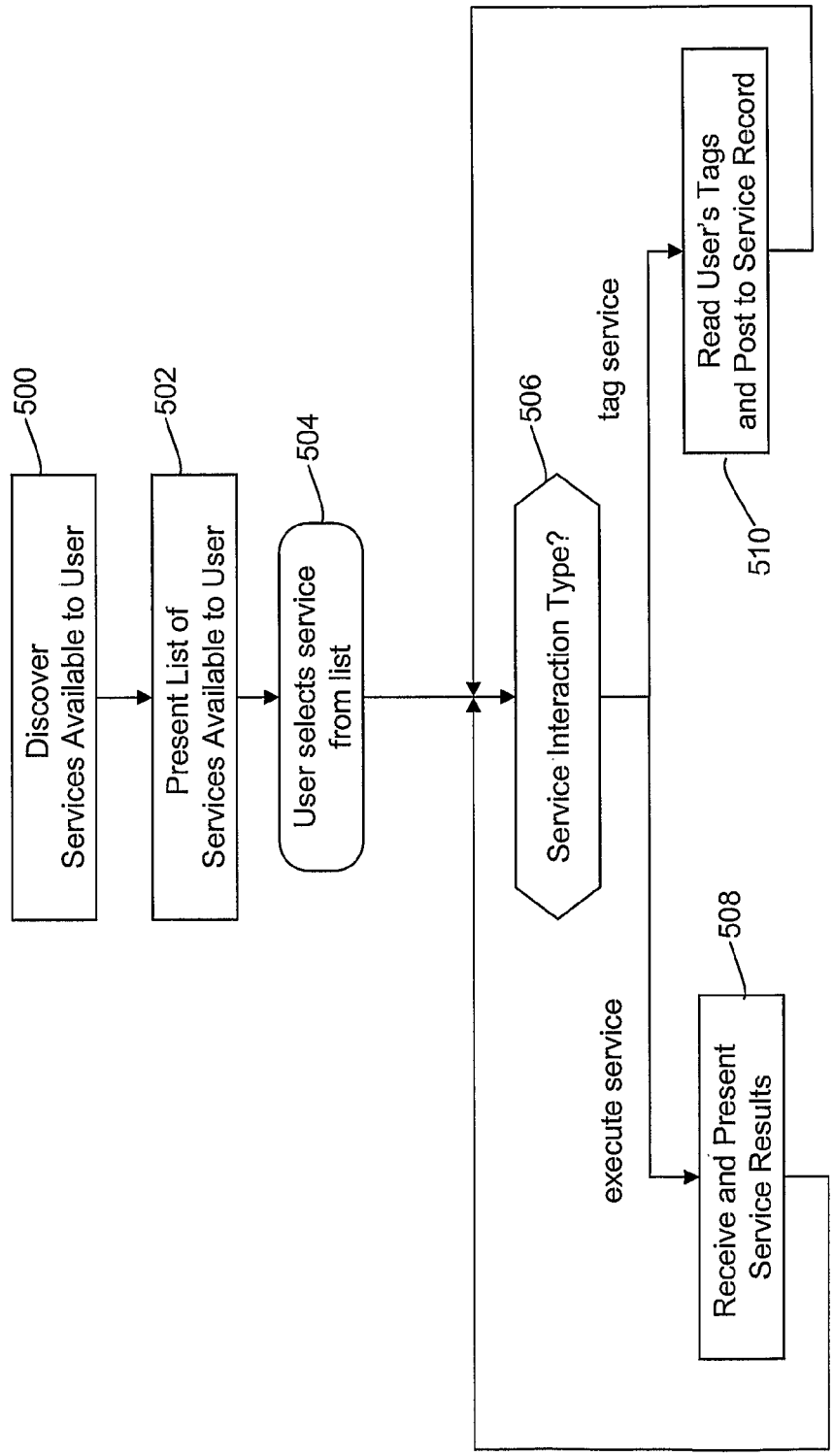
FIG. 5 is a flow-chart illustrating the operation of a service browser for discovering services and presenting the output of those services.
Figure 6:
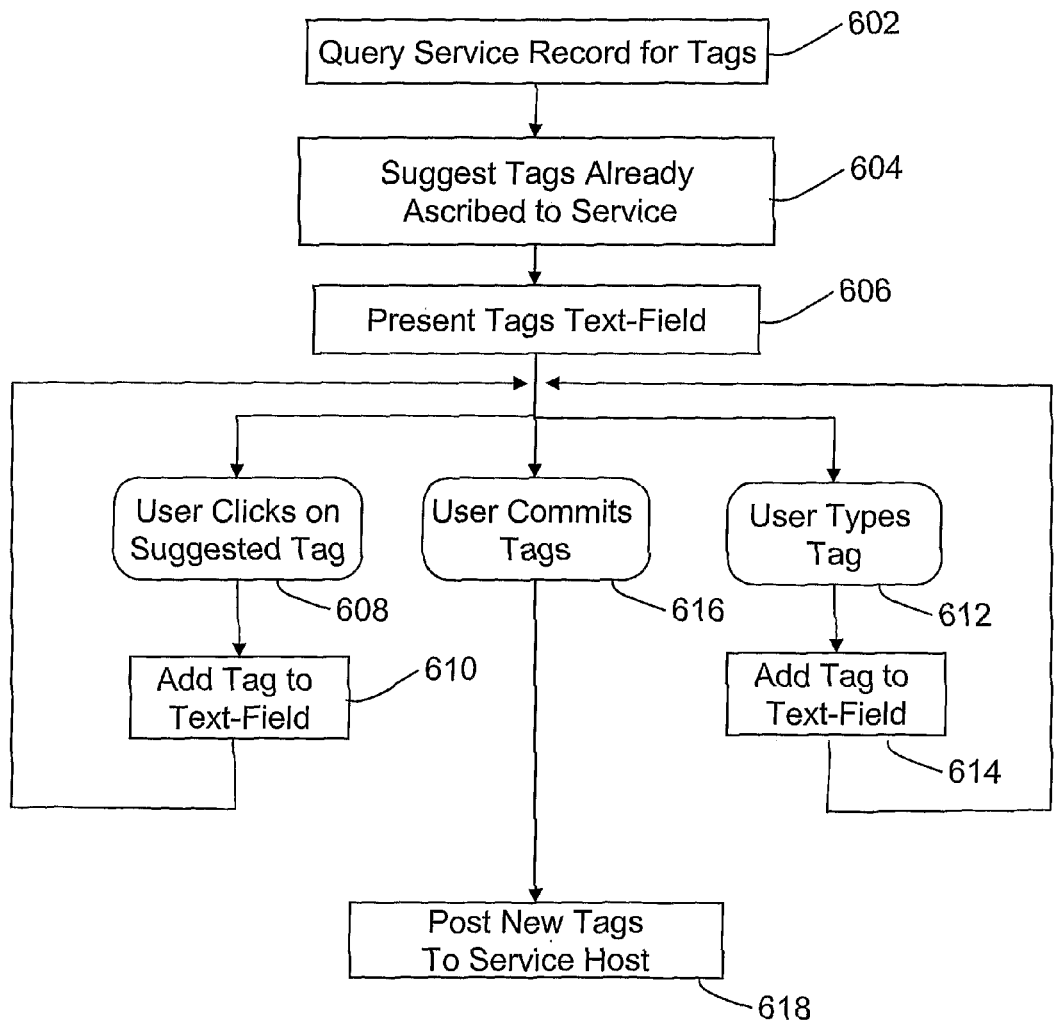
FIG. 6 is a flow-chart showing the operation of the service tagging interface offered by the service browser in more detail.

FIG. 5 shows the operation of the user computer U when the Nexus service browser is run on that computer. When the program is started by the user, the Nexus middleware is used to discover (step 500) services which are available via the network 10. The service browser then presents (step 502) the user with a list of the available services. If a service taxonomy is found stored on the device, then the available services might be presented as a collapsible/expandable tree that mirrors the service taxonomy (FIG. 3). The user is then prompted to select a service from the list. On selecting (step 504) a service the user is then asked (step 506) to select whether he wishes to execute the selected service or tag the selected service. If the user chooses to execute the selected service then the service host executes the service and returns (step 508) the result of the service—which may merely be an assurance that a requested service was carried out—to the user's computer U. If the user chooses to tag the selected service then the processing shown in FIG. 6 is carried out.

The user tagging process (FIG. 6) begins by sending (602) a database query to the electronic device which hosts the service in question (C1, C2, C3, C4, H1, H2, S1, S2, F1, P1). This query returns a list of tags already ascribed to the service. Those tags are presented (step 606) to the user as part of the tagging interface.

The interface also presents (step 606) a text-field which allows the user to type in a plurality of tags separated by spaces.

If the user clicks (608) on one of the suggested tags (which will be a tag which has been ascribed to the service by the service installer, administrator or one or more other users), then the tag is automatically written into the text field. Words the user types are also added (step 614) to the text field. When the user commits the tags by pressing the return or enter key, or pressing a 'Commit' button, the tags in the text field are transmitted (step 618) to the electronic device (C1, C2, C3, C4, H1, H2, S1, S2, F1, P1) hosting the service in question. On receipt of that message, the electronic device (C1, C2, C3, C4, H1, H2, S1, S2, F1, P1) updates it service record by adding the committed tags to its record.

Figure 7:
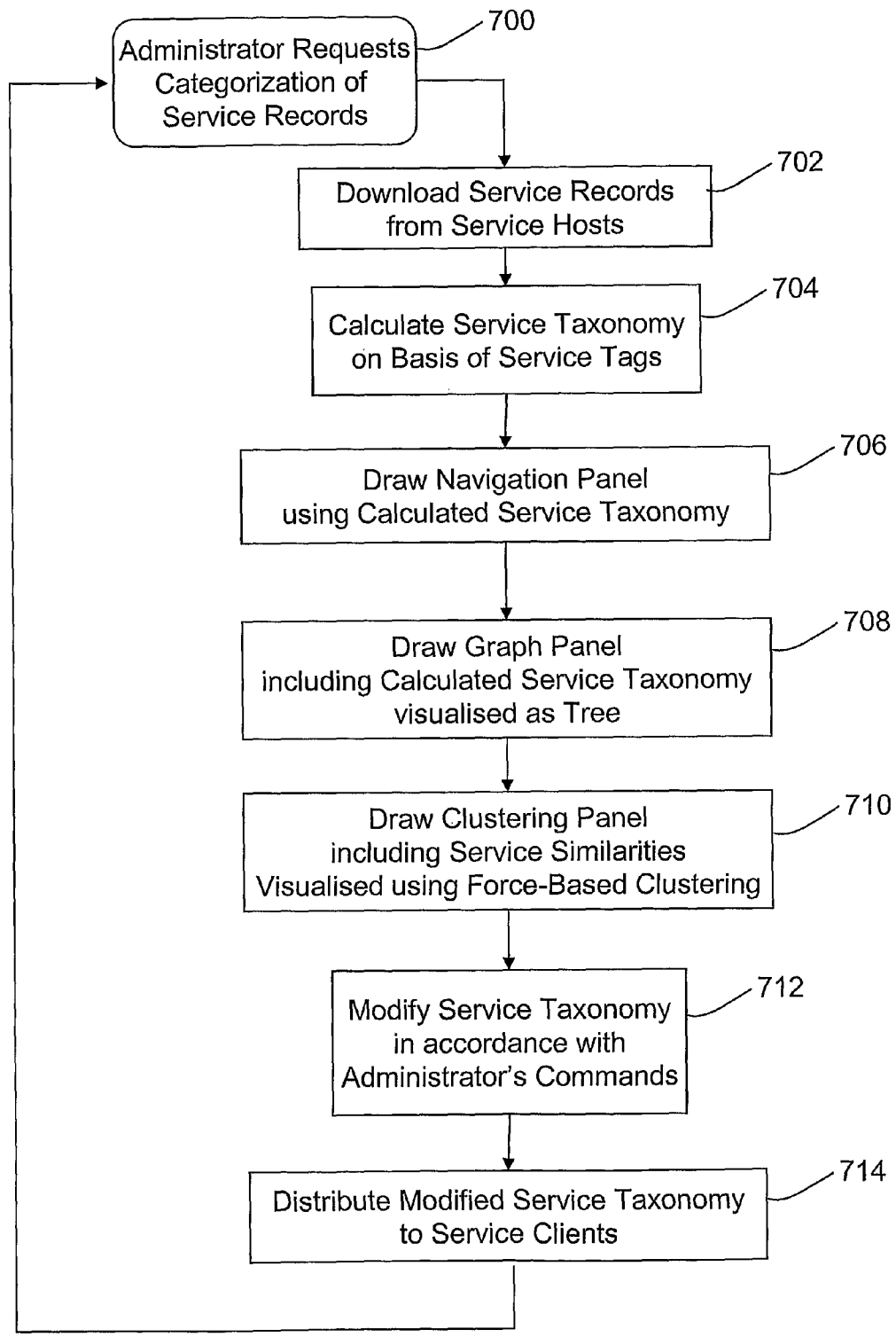
FIG. 7 is a flow-chart illustrating how an administration computer in the service-based infrastructure performs the semi-automatic construction of a service taxonomy for subsequent use in the service-based infrastructure.

FIG. 7 shows the semi-automatic categorization process which is performed by the management application loaded onto the Administrator's computer A. As will more be explained more fully below, the categorisation process is semi-automatic in that the program generates a proposed categorisation automatically and then provides the administrator with an interface (FIGS. 10 and 11) which enables him to modify that categorisation manually.

The semi-automatic categorization process (FIG. 7) is triggered by the administrator requesting (step 700) the categorization of the service records in the system. The categorization process begins with the administration computer A downloading (step 702) the service records (FIGS. 2A-2J) from each of the electronic devices (C1, C2, C3, C4, H1, H2, S1, S2, F1, P1) and concatenating those records in order to form a service table, each row of which corresponds to a service record (FIG. 2A-2J).

Figure 8:
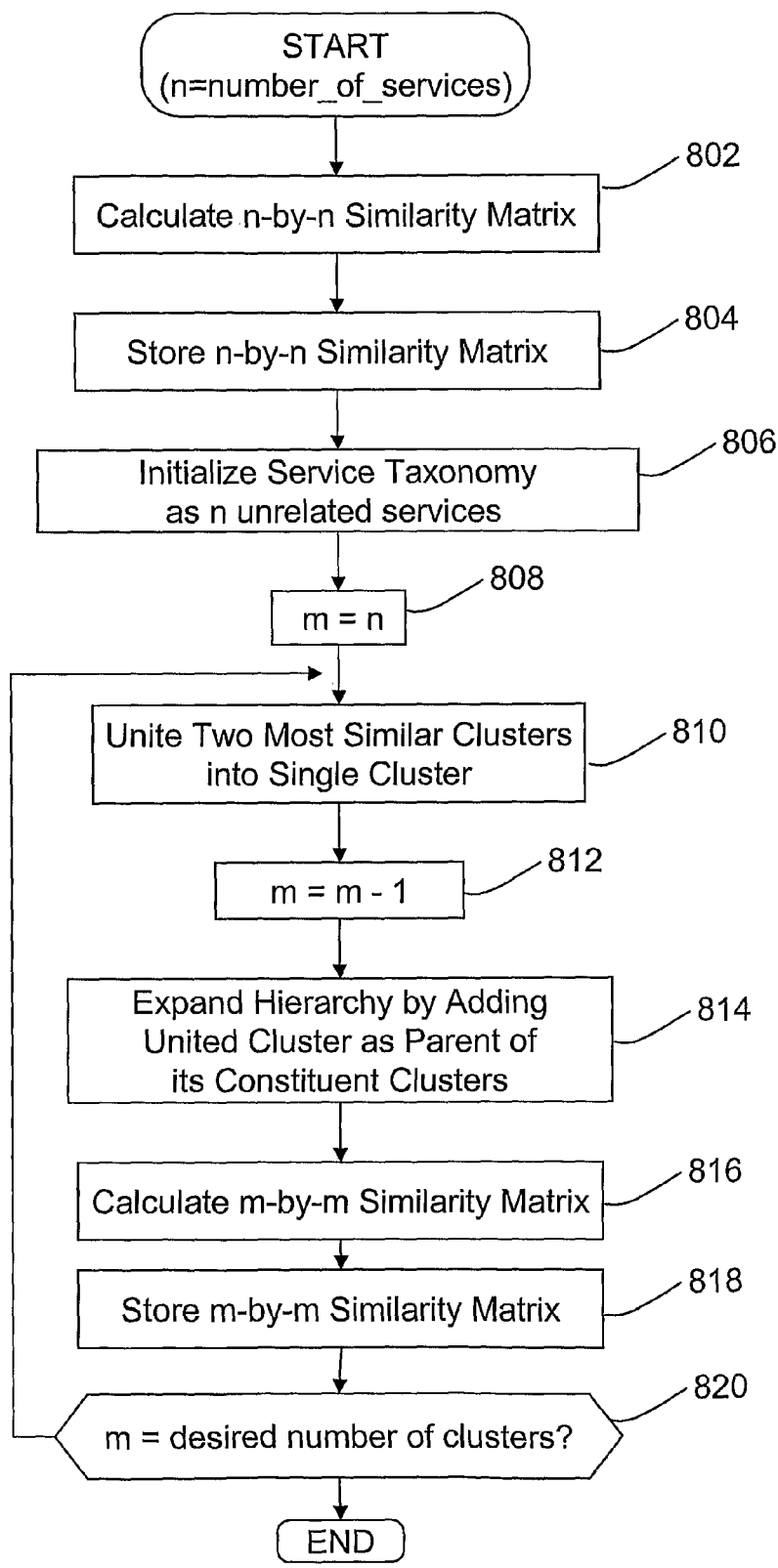
FIG. 8 is a flow-chart showing the automatic phase of the construction of a service taxonomy.

The service table is then processed (step 704) to derive a hierarchical categorisation of the different services (the service taxonomy of FIG. 3) on the basis of the tags found in the downloaded service records (FIGS. 2A-2J). This automatic tag-based categorization will now be described in more detail with reference to FIG. 8.

The clustering (FIG. 8) follows a bottom-up approach where each of the n (in this example 10) services is initially regarded as a service cluster containing only that service. The process begins with the calculation of an n-by-n similarity matrix (step 802).

Figures 9A, 9B:
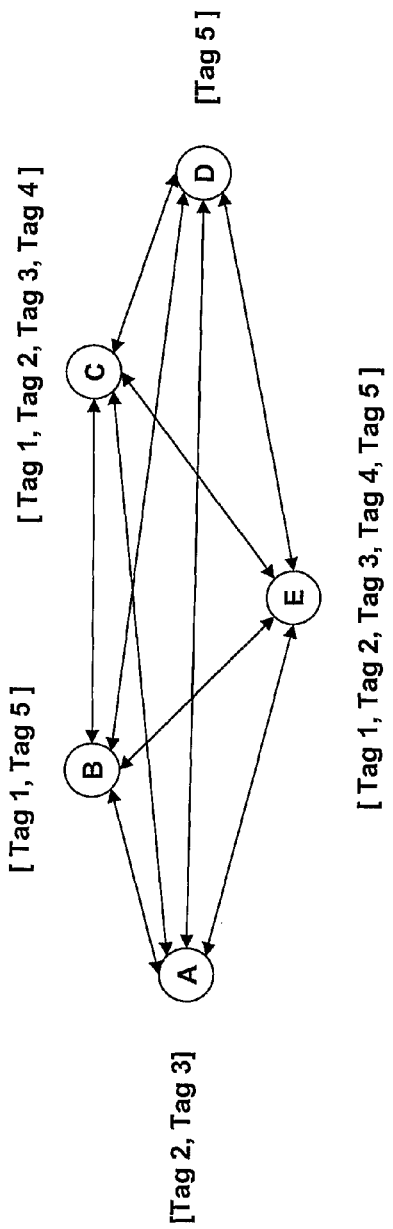
FIGS. 9A and 9B illustrate in more detail the calculations which are used in the automatic taxonomy construction.

To illustrate the calculation of a n-by-n similarity matrix, an example of 5 services (A-E) and the tags associated with them is seen in FIG. 9A. For each pair of services, a tag-based similarity measure is calculated according to the following equation:

$$\text{similarity}(A, B) = \frac{\text{number\_of\_tags\_A\_and\_B\_have\_in\_common}}{\sqrt{\text{number\_of\_tags\_in\_A}} \sqrt{\text{number\_of\_tags\_in\_B}}}$$

Those skilled in the art will recognise this as a form of cosine similarity between the set of tags in set A and the set of tags in set B. The resulting n-by-n similarity matrix is seen in FIG. 9B. Those skilled in the art will realise that the matrix is symmetric, and hence only the elements above or below the diagonal need be calculated—the values along the diagonal also need not be calculated since they are by definition equal to 1.0.

Once the service similarity matrix has been calculated, it is stored (step 804) for use in subsequent visualisation of service similarity as will be described below.

An abstract data type representing the service taxonomy is then initialised as a set of n services (step 806) without any relationships between them. As will be explained below, the automatic categorisation process will add relationships between the services in order to build up a service taxonomy as seen in FIG. 3. Each node of the service taxonomy includes a list of tags associated with that node.

Thereafter, a cluster count (m) is initialised (step 808) to the number of services (n). This is followed by one or more iterations of a taxonomy building process (steps 810-818).

Each of the iterations of the taxonomy-building process begins with the most similar pair of clusters being identified and combined into a single cluster (step 810). For example, given the 5-by-5 similarity matrix seen in FIG. 9B, the services C and E will be identified as the most similar pair, and combined into a single cluster. The cluster count is reduced accordingly (step 812).

A node representing the combined cluster is then added to the service taxonomy, together with relationship data indicating that the combined cluster is a parent of each of the constituent services (or constituent clusters, or constituent service and cluster) (step 814). The lists of tags associated with each of the constituent services (or constituent clusters, or constituent service and cluster) will be combined to generate a list of tags (the intersection of two sets of tags) which is stored with the node representing the combined cluster.

An m-by-m similarity matrix is then calculated (step 816) by finding similarity measures between the new combined cluster and each of the other clusters/services (the other similarity values can simply be copied from the previous similarity matrix calculation). The similarity measures to the newly combined cluster are calculated using the combined list of tags mentioned above. The m-by-m similarity matrix is then stored (step 818).

A test (step 1006) is then carried out to determine whether sufficient clustering has now taken place. The test might simply be whether a desired number of clusters (say six in this particular example) has been reached. If the test is not met, then another iteration of the taxonomy-building process (steps 810-818) is carried out.

If sufficient clustering has taken place then the automatic phase of the semi-automatic categorization process ends (step 820).

Figure 10:
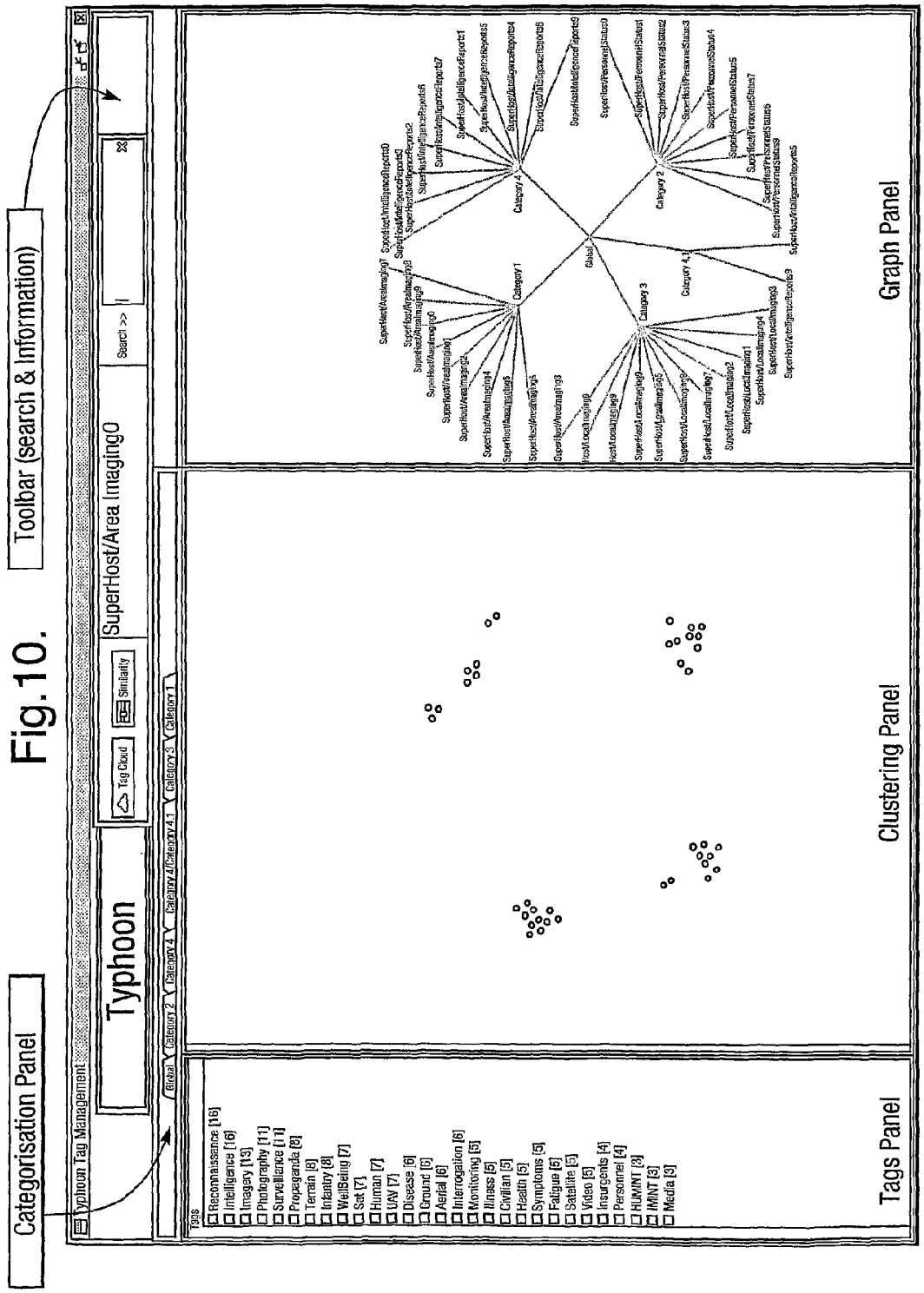
FIG. 10 shows a graphical user interface that presents the automatically-generated taxonomy to an administrator.

FIG. 10 shows the interface presented to the administrator. The graphical user interface is partitioned into five panels as follows:

Clustering Panel: The services in the system are represented abstractly in this panel as circles and it is here (as will be explained below) that force-based clustering is applied as one means to enable the administrator to visualise relationships between them.

Navigation Panel: A set of tabs in this panel allow the user to alter the view of the system in the clustering panel by selecting subsets. Any existing structure in the form of categories of services (e.g. the taxonomy illustrated in FIG. 3) is reflected here with one tab per category.

Tag Panel: The top tags in the entire system of services are displayed in a ranked list. These may be selected and the view on the clustering panel will be updated accordingly.

Graph Panel: Any existing structure in the system of services is displayed in this panel as a graph. The structure might, for example, be a tree representation of the taxonomy illustrated in FIG. 3.

Toolbar: Details about the currently selected services are displayed in this panel as well as a search box offering the user to filter the view of the system by means of keywords. Additional pop-up panels are also accessible from here such as a tag cloud view.

Returning to FIG. 7, the semi-automatic categorization process continues by drawing different components of the management application's graphical user interface.

To provide the various visualisations seen in the graphical user interface a package called Prefuse (www.prefuse.org) is used.

The navigation panel is drawn using the service taxonomy calculated in the automatic categorization routine. A tab is presented for the currently selected category of the service taxonomy (FIG. 3). Initially, the category is set to the global 'services' category. In addition, tabs representing the immediate sub-categories are displayed. When the currently selected tab is not that representing the highest-level category, a further tab is provided which allows the administrator to move up one hierarchical level in the service taxonomy.

The graph panel is also drawn using the service taxonomy calculated in the automatic categorization routine. The service taxonomy is presented there in tree form.

The clustering panel is drawn (step 708) using a force-based clustering visualisation tool offered as part of the Prefuse package. The tool presents services as circles in the clustering panel and then moves them as if there were an attractive spring force between the circles which is in proportion to the cosine similarity between the services taken from the n-by-n similarity matrix calculated in step 804. This can assist the user in seeing how he might modify the membership of the different categories in order to improve upon the automatic categorisation.

In a preferred embodiment, the membership of the automatically generated categories is shown by distinctively highlighting the services belonging to different categories. An example of this can be seen in FIG. 11 where six automatically generated categories (1102-1112) are shown.

Returning to FIG. 7, the management application's graphical user interface allows the administrator to view the service taxonomy in the following ways.

Selection of Tab in Navigation Panel

By selecting a tab other than the one which represents the highest-level category, then only those services within the selected category are shown in the clustering panel.

Selection of Tag(s) in Tag Panel

On the administrator selecting one or more tags from the ranked list of tags in the tag panel the services having the selected tags are highlighted in the clustering panel.

Figure 11:
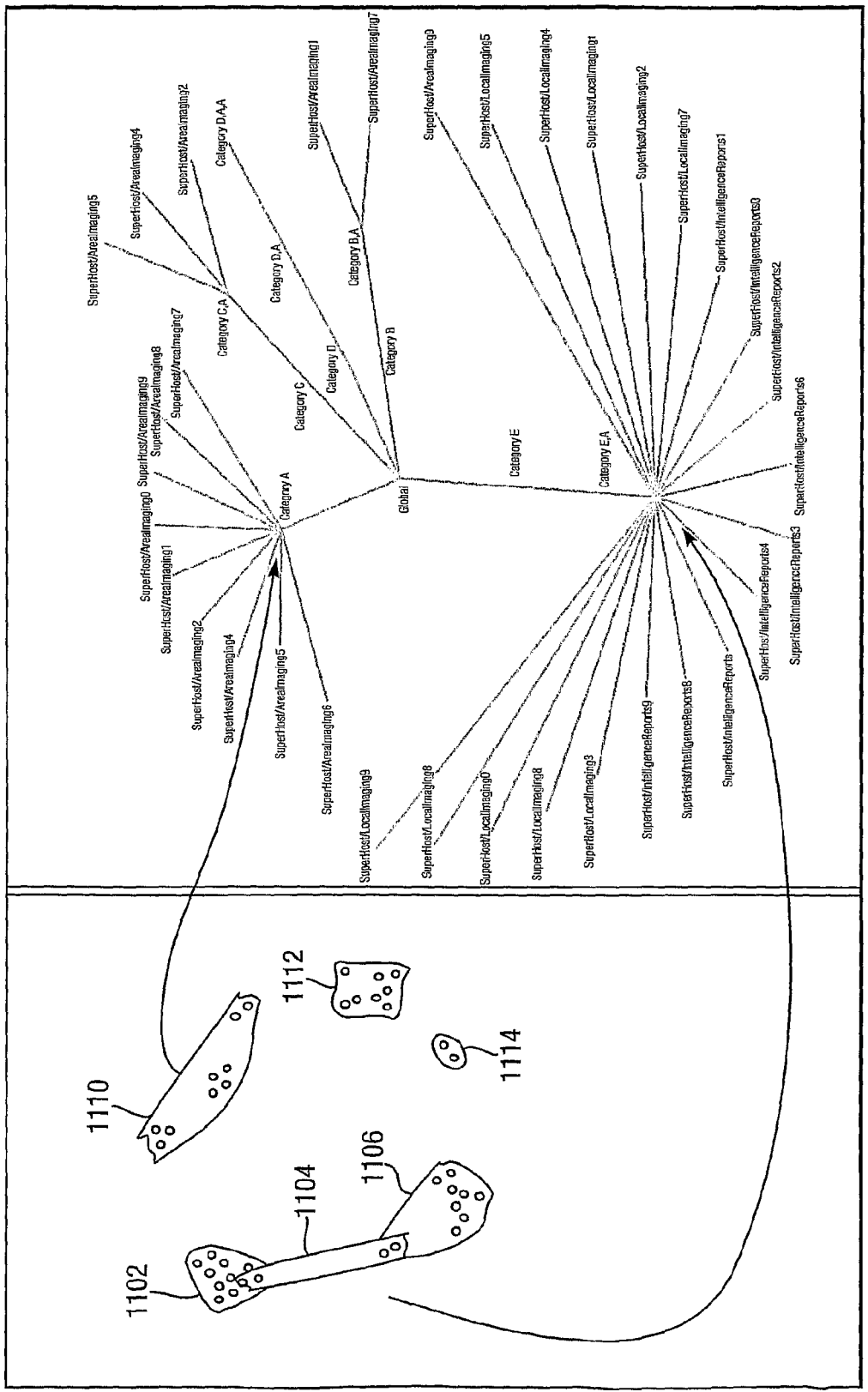
FIG. 11 shows how the administrator can use the graphical user interface to modify the automatically-generated taxonomy.

The management program then modifies (step 710) the service taxonomy (FIG. 3) in accordance with commands entered by the administrator using the graphical user interface (FIGS. 10 and 11).

Selection of Services in Clustering Panel

By selecting a group of entities in the clustering panel and issuing a 'Group' command, then the selected entities are formed into a group. The user is prompted to give a name to group. The service taxonomy is then updated to by adding a sub-category to whatever category is currently selected using the Navigation Panel. It will be realised that this enables the user to both merge and split categories.

Drag-and-Drop of Service Groups to Graph Panel

By selecting a group of services in the clustering panel, and then 'dragging-and-dropping' the selected group to a node on the tree drawn in the graph panel, the selected group is made a sub-category of whatever category is represented by the node on which the group is 'dropped'.

When the administrator considers that his modifications to the service taxonomy provide a beneficial categorisation of the services, he requests the administration computer to distribute (step 712) the modified service taxonomy to client computers (e.g. user computer U) in the network. The client computers then store the modified service taxonomy in persistent storage (12).

Thereafter, on finding that a remote service required by a user is not available, applications running on those client computers can the use the categorisation to propose other services in the same category as substitutes or even automatically substitute services in the same category.

It will be seen how the above embodiment improves the resilience of distributed applications running in a service-based infrastructure. It will also be seen how the combination of automatic categorization of services and its refinement by a human administrator combines the speed and potential scope of automatic categorization with the benefits of verification by human intelligence.

Possible modifications to the above embodiment include:

i) rather than services being tagged, documents, especially web-pages could be tagged. In that case, the benefit of expedited retrieval of documents relevant to a user's query would be realised ii) instead of the service records being distributed at service hosts, a centralised database could be used storing a plurality of records—each including, for example, URLs, tags ascribed to the URLs, and user IDs for each tag submitted iii) the service records could further include tag frequency for each tag, in that case, a more sophisticated cosine similarity based on tf-idf (term frequency—inverse document frequency) could still be calculated.

iv) a Euclidean similarity measure or other well-known document similarity measure could be used instead of a cosine similarity measure v) the administration facility could be built into the service browser vi) a service taxonomy could be imported to the management application and displayed in the graph panel. The user could then modify the existing taxonomy on the basis of the results of force-based clustering in the clustering panel vii) the above example focussed on the application of the invention to web services or other distributed application components. The present invention is also of great utility in the organisation of forum posts where many users submit their views on varied topics to a central server which stores all the forum posts together viii) Finally, it should be noted, that from a middleware point of View there are uses of the taxonomy other than just presentation/filtering for the user. Although not explained in the Nexus reference mentioned above, the latest version of Nexus uses Topics to transmit messages across its Publish/Subscribe messaging infrastructure. One of the main benefits for having an administration system such as that described above is to reflect semantic taxonomic knowledge about the services down to the level that they are being advertised across the network. This way a user can (or the system on behalf of the user) can choose to only subscribe to the relevant subset of information (about Service Record changed etc.) and as such a bandwidth reduction may be achieved (especially important in a large-scale distributed system with low bandwidth). This provides content-based routing, not by the routing mechanism directly examining the content (e.g. deep-packet inspection), but instead indirectly from a variation of the above embodiment which analyses the metadata and involves the user in the process (taking the actual content into account) to derive the best possible set of categories, i.e. Topics to which the messaging infrastructure itself is structured.

In summary of the above, the present invention relates to distributed systems in which resource utilisation decisions depend upon the semi-automatic categorisation of resource descriptions stored in the distributed system. In the principal embodiment, the resource descriptions are web service descriptions which are augmented with tags (i.e. descriptive words or phrases) entered by users and/or by web service administrators. The initial use of automatic categorisation of these descriptions, followed by a user-driven fine-tuning of the automatically-generated categories enables the rapid creation of reliable categorisation of the resource descriptions, which in turns results in better resource utilisation decisions and hence a more efficient use of the resources of the distributed system.

What is claimed is:

1. A distributed system comprising one or more administration computers arranged in operation to at least:
   i) receive a plurality of digital resource identifiers and, for each identified digital resource, a set of one or more tags attributed to said digital resource;
   ii) generate a classification of said digital resources by automatically generating categories of said digital resources by calculating a measure or the similarity between said sets of one more tags attributed to said digital resources, each category including one or more of said digital resources;
   iii) generate, for display to a human user, a graphical user interface enabling modification of said classification;
   iv) modify said classification in accordance with user commands received via said graphical user interface; and
   v) utilise said modified classification in identifying one or more digital resources in said digital system; and
   vi) use said digital resource in said distributed system.

2. A distributed system according to claim 1 wherein said graphical user interface represents said digital resources as graphical elements whose relative locations on said display are calculated in dependence on a measure of similarity of said digital resources calculated in dependence on said tags attributed to said digital resources.

3. A distributed system according to claim 2 wherein said classification is hierarchical.

4. A distributed system according to claim 1 wherein said automatic arrangement of said digital resources into categories involves finding the degree of semantic similarity in different tags attributed to said digital resources.

5. A distributed system according to claim 3 wherein said graphical user interface enables said user to select a group of graphical elements to represent a category and introduce said category into the hierarchical classification.

6. A distributed system according to claim 3 wherein said graphical user interface also includes a tree structure which represents said hierarchical classification.

7. A distributed system according to claim 3 wherein said graphical user interface enables a user to select classes in the hierarchical classification and selectively presents only the graphical elements representing digital resources in the selected classes.

8. A distributed system according to claim 1 wherein said distributed system further comprises:
   a store of digital resource identifiers and tags attributed to the digital resources in communication with said administration computer;
   said administration computer being arranged to receive digital resource identifiers and tags attributed thereto by downloading them from said store;
   one or more client computers in communication with said store and arranged in operation to enable a user to use a digital resource and transmit tags the user ascribes to that digital resource to said store for association with the digital resource identifier corresponding to said resource.

9. A distributed system according to claim 1 wherein said distributed system further comprises:
   a computer network, and
   one or more client computers connected to said administration computer via said computer network,
   said administration computer being further arranged in operation to send said classification to said client computers,
   said client computers being further arranged in operation to utilise said classification in identifying a required digital resource, and thereafter to utilise said identified resource.

10. A distributed system according to claim 1 wherein said digital resources are executable software components of a distributed application program executable on said distributed system.

11. A method of using digital resources in a distributed system, said method comprising:
   i) receiving a plurality of digital resource identifiers and, for each identified digital resource, a set of one or more tags attributed to said digital resource; and
   ii) generating a classification of said digital resources by automatically generating categories of said digital resources by calculating a measure of the similarity between said sets of one or more tags using a computer system, each category including one or more of said digital resources;
   iii) generating, for display to a human user, a graphical user interface enabling modification of said classification;
   iv) modifying said classification in accordance with user commands received via said graphical user interface; and
   v) utilising said modified classification in identifying one or more digital resources in said digital system; and
   vi) using said digital resource in said distributed system.

12. A non-transitory computer-readable storage medium storing a computer program, which upon execution by a computer, provides operation comprising:
   i) receiving a plurality of digital resource identifiers and, for each identified digital resource, a set of one or more tags attributed to said digital resource; and
   ii) generating a classification of said digital resources by automatically generating categories of said digital resources by calculating a measure of the similarity between said sets of one or more tags, each category including one or more of said digital resources;
   iii) generating a display including a graphical user interface enabling modification of said classification;
   iv) modifying said classification in accordance with user commands received via said graphical user interface; and
   v) utilising said modified classification in identifying one or more digital resources in said digital system; and
   vi) using said digital resource in said distributed system.

13. A method according to claim 11 wherein said graphical user interface represents said digital resources as graphical elements whose relative locations on said display are calculated in dependence on a measure of similarity of said digital resources calculated in dependence on said tags attributed to said digital resources.

14. A method according to claim 11 wherein said automatic arrangement of said digital resources into categories involves finding the degree of semantic similarity in different tags attributed to said digital resources.

15. A method according to claim 11 wherein the classification is hierarchical and said graphical user interface enables said user to select a group of graphical elements to represent a category and introduce said category into the hierarchical classification.

16. A method according to claim 11 wherein the classification is hierarchical and said graphical user interface also includes a tree structure which represents said hierarchical classification.

17. A method according to claim 11 wherein the classification is hierarchical and said graphical user interface enables a user to select classes in the hierarchical classification and selectively presents only the graphical elements representing digital resources in the selected classes.

18. A method according to claim 11 further comprising
transmitting the modified classification to one or more client computers over a computer network so that the modified classification can be utilized in identifying a digital resource.

19. A method according to claim 11 wherein said digital resources are executable software components of a distributed application program executable on said distributed system.

* * * * *